Nov. 10, 1970  G. GEREK ET AL  3,539,440
SELF-ADHESIVE COATED LAMINATES
Filed Feb. 12, 1968
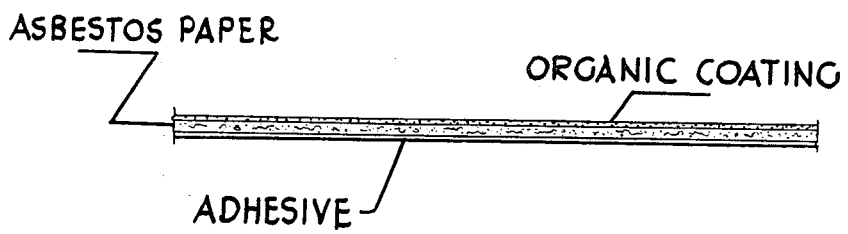
INVENTORS
GENE GEREK
ROWLAND S. HARTZELL
BY *Christian a/ Spencer*
ATTORNEYS

United States Patent Office 3,539,440
Patented Nov. 10, 1970

3,539,440
SELF-ADHESIVE COATED LAMINATES
Gene Gerek, Cheswick, and Rowland S. Hartzell, Gibsonia, Pa., assignors to PPG Industries, Inc., a corporation of Pennnsylvania
Continuation-in-part of application Ser. No. 561,625, June 29, 1966. This application Feb. 12, 1968, Ser. No. 704,807
Int. Cl. B32b *19/04, 27/12;* C09j *7/04*
U.S. Cl. 161—167
17 Claims

ABSTRACT OF THE DISCLOSURE

Self-adhesive asbestos laminates are made up of non-woven asbestos sheet material, such as asbestos paper, having a resinous organic coating on one side and an adhesive, preferably a normally tacky pressure-sensitive adhesive, on the other side. Such coated laminates can be applied to various substrates, such as exterior or interior wall surfaces, cabinets, appliances etc., for protective and/or decorative purposes.

---

This application is a continuation-in-part of copending application Ser. No. 561,625, filed June 29, 1966.

Coated wood products made by applying a layer of asbestos having thereon an organic coating to a wood surface are described in application Ser. No. 561,625. This permits, for example, the application of thermosetting or heat-fusible organic coatings to wood substrates and provides composite wood articles having exceptional surface characteristics. Such coated wood products are useful in structural wood panels for interior or exterior use, woodwork, woodwork trim, etc., and for other purposes where the outstanding durability and other properties of the organic coating employed are desired.

The present invention provides coated laminates comprising non-woven asbestos in sheet form coated on one major surface with an organic coating composition and on the other major surface with an adhesive. The accompanying drawing illustrates such a self-adhesive coated laminate. Such products can be easily applied in various consumer and industrial applications to provide coated surfaces of many types. For example, they can be applied to wood surfaces without the need for added adhesives to provide coated wood products such as are described in the forgoing application. They can also be applied to interior and exterior wall surfaces, cabinets, furniture, appliances, vehicles etc., made of many different materials, such as plaster, cement, stone, gypsum, metals, plastics, glass, leather, and painted surfaces of various types.

As mentioned above, the laminates herein are comprised of non-woven asbestos sheet material which is coated on one side with a resinous organic coating composition and on the other side with an adhesive. The non-woven asbestos sheet material employed contains asbestos as the major functional constituent, and is ordinarily made of asbestos fibers bonded together with a binder to form an asbestos paper. Generally, such paper has a thickness of from about 5 to about 50 mils. The amount of binder present in these papers varies considerably; in some cases little or no binder is employed, whereas in other instances the amount of binder is substantial.

Asbestos fabrics and other woven forms of asbestos are not useful in the present invention because such materials cannot be successfully coated on both sides as required to produce the products described herein (except possibly by use of special methods which are unsatisfactory for commercial practice). This is due to the non-continuous nature of fabrics and woven materials in general and the interstices therein which permit penetration of the coating composition and/or adhesive through the fabric. This is particularly troublesome with low viscosity coating compositions, such as latices or dispersions, which are often highly desirable for use herein. An analogous problem is mentioned in British patent specification No. 829,023 in connection with certain coatings on fabrics.

The ordinary commercial types of non-woven asbestos paper can be utilized herein and these are ordinarily produced by methods similar to those employed in production of conventional cellulosic papers. The types of binders utilized include natural or synthetic rubber-based binders, acrylic resins, polyvinyl chloride, and other natural and synthetic gums and glues. In some cases, a sizing material, such as casein or starch, is used to coat the fibers or the sheet material. In some papers no binder is used; in some instances a small amount of size may be applied and aids in forming the sheet. The choice of binder is based upon considerations such as the use for which the product is designed and the coating or adhesive to be applied. For example, acrylic resin binders are most often used, but where a fire-retardant product is desired a non-flammable binder, such as poly(vinyl chloride) or a vinyl chloride-vinyl acetate copolymer should be used. Vinyl chloride polymer binders should also be employed directly under poly(vinylidene fluoride) coatings because better resistance properties are obtained, probably due to better compatibility.

Various non-woven asbestos sheets which contain minor amounts of other fibers and materials, such as cellulose acetate fibers, glass fibers, wire, etc., can also be employed. In some instances, the non-woven asbestos sheet may contain a layer of another substance, such as glass fibers or other reinforcement, interposed between layers of asbestos.

The asbestos itself can be of any of the mineral materials which are encompassed within the meaning of this term. Chrysotile is the most common type of asbestos material, but other mineral species, such as crocidolite, amosite, anthophyllite, termolite and actinolite, can also be included. Asbestos is, in general, composed of hydrated silicates in metamorphic form and is obtained from certain types of silica-bearing mineral rocks.

The resinous organic coating which is applied to the asbestos sheet can also be of various types, including compositions based upon both thermoplastic and thermosetting resins and various combinations of resins. One very important advantage of the products of the invention is that thermosetting or heat-fusible resinous coatings which require relatively high temperatures for curing or fusing are easily employed; this cannot be done with many sheet materials, such as cellulosic and other organic materials, nor with many of the substrates to which the coated products may be applied.

Among the various resins which can be employed in the organic coating compositions utilized are:

VINYL HALIDE RESINS

This group includes poly(vinyl chloride) and poly(vinyl fluoride), as well as interpolymers of such monomers with other copolymerizable monomers, such as vinyl acetate. These may be in the form of plastisols, organosols, and other dispersions in aqueous or organic solvents, or as solutions in various solvents in which the polymer is soluble.

VINYLIDENE HALIDE RESINS

These polymers include poly(vinylidene chloride) and poly(vinylidene fluoride), which is a preferred coating resin for use in the invention. These too can be in solution or dispersion form.

ALKYD RESINS

This group includes the well-known oil-modified glyceryl phthalate resins, as well as any other of the saturated or unsaturated alkyd resins utilized in the coatings field. These are produced from any polybasic acid and polyfunctional acids as phthalic acid, maleic acid, fumaric acid, isophthalic acid, and the like, as well as from anhydrides of such acids. The polyfunctional alcohol can be, for example, glycerine, sorbitol, ethylene glycol and diethylene glycol and similar polyols. Oil-free saturated polyesters are especially desirable; these and other alkyds are often utilized in combination with an amino resin.

HYDROCARBON RESINS

Included here are polyethylene, polypropylene, polybutadiene, polyisobutylene and polystyrene resins, as well as interpolymers of the same, such as ethylene-propylene copolymers and ethylene-propylene-diene terpolymer resins. Elastomeric materials, such as hydrocarbon rubbery polymers, including those modified by halogenation or sulfonation, can also be used. Such rubbery polymers include the polymers prepared by the simultaneous chlorination and chlorosulfonation of polyethylene ("Hypalon") as well as elastomeric materials based on 2-chlorobutadiene-1,3,2-methylpropene or 3-methyl-1,3-butadine.

ACRYLIC RESINS

This group includes both thermosetting and thermoplastic acrylics; these can be in solution or in latex form. Typical thermoplastic acrylics are the polymers and copolymers of esters of acrylic and methacrylic acids, e.g., poly(methyl methacrylate), methyl methacrylate-lauryl methacrylate copolymers, etc. Especially useful acrylic resins are hydroxyl-containing or carboxyl-containing acrylic polymers, which may be combined with an aminealdehyde resin or an epoxy resin to form a thermosetting composition. Representative interpolymers of this type include a hydroxy-alkyl ester of an unsaturated carboxylic acid, for example, hydroxyethyl methacrylate, hydroxypropyl methacrylate, hydroxyethyl hydrogen fumarate, and others, interpolymerized with one or more other ethylenic monomers, such as styrene, 2-ethylhexyl acrylate, methyl methacrylate, butyl methacrylate, ethyl acrylate, butyl acrylate, acrylonitrile, acrylic acid and methacrylic acid. Certain compositions and interpolymers containing hydroxyalkyl esters are described in U.S. Pats. 2,681,897, 3,002,959, and 3,082,184, and in copending application Ser. No. 560,104, filed June 24, 1966 now Pat. No. 3,382,294.

Other thermosetting acrylics, such as aldehyde-modified amide interpolymers containing crosslinking functional groups such as methylol or alkoxymethyl groups, are also quite useful. Examples of this class are shown in U.S. Pats. Nos. 2,870,117; 2,978,437; 3,037,963; and 3,079,434. These interpolymers comprise an unsaturated carboxylic acid amide such as acrylamide with one or more other ethylenic monomers, with the amide groups being reacted with an aldehyde and, usually, an alcohol.

AMINO RESINS

Included within this group are aminealdehyde resins; that is, the aldehyde condensation products of melamine, urea, benzoguanamine, or a similar compound. Generally, the aldehyde employed is formaldehyde, and resins produced from melamine or urea are most common and are preferred, although condensation products of other amines or amides can also be employed.

EPOXY RESINS

Among the useful resins are epoxy resins, including those obtained by reaction of polyphenols with epichlorohydrin, such as, for example, the product of the reaction of 2,2-bis(4-hydroxyphenyl)propane with epichlorohydrin.

Also useful are novolak epoxy resins, which are reaction products of epichlorohydrin and low molecular weight condensation products of formaldehyde and a phenol or alkylphenol; aliphatic and cycloaliphatic expoxides, such as are produced by epoxidizing unsaturated alicyclic compounds with peracetic acid, epoxy esters, such as those prepared by esterification of epoxy resins with fatty or rosin acids; and epoxidized oils such as epoxidized soybean oil.

POLYESTER RESINS

This class includes materials made from glycols such as propylene glycol, diethylene glycol and dipropylene glycol and unsaturated acids and anhydrides, combined with copolymerizable monomers such as styrene, vinyl toluene or methyl methacrylate. Saturated acids such as isophthalic and adipic acid can also be included in the resin.

ORGANOPOLYSILOXANE RESINS

This group includes methyl and phenyl-substituted organopolysiloxane resins, such as dimethyltriphenyltrimethoxytrisiloxane, as well as others represented by the general unit formula:

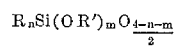

where R is a monovalent organic radical bonded to silicon bond and R' is hydrogen, an alkyl radical, an aryl radical, or an acyl radical. The value of $n$ in the above formula is ordinarily between about 0.5 and 1.9 and the value of $m$ is between 0.01 and 2.5; the value of $m$ plus $n$ is between 0.51 and 3. Also included are the flexible organopolysiloxanes known as silicone rubber.

PHENOLIC RESINS

This group includes phenol-formaldehyde resins such as those made from phenol, cresol and xylenol and substituted phenols such as p-phenylphenol and p-tertiaryamyphenol. Rosin-modified and other terpene-modified phenolics can also be used.

It is often advantageous to use compatible combinations of the above thermosetting and thermoplastic resins, such as, for example, combinations of aldehyde-modified, unsaturated carboxylic acid amide resins and poly(vinylidene fluoride) resins.

While it is seen from the above the choice of coating materials is large, from a practical standpoint the advantages of the invention are best obtained using particular coatings. Preferred coating compositions are those in which the major resinous component is a polymer of monomers consisting essentially of polymerizable compounds having a $CH_2=C<$ group. Such monomers include vinyl halides, such as vinyl chloride; vinylidene halides, such as vinylidene fluoride; and acrylic monomers, such as those mentioned above. Poly(vinylidene fluoride), alone or in combination with other resins, such as the aldehyde-modified carboxylic acid amide interpolymers described above, provide especially preferred coatings, especially for the outermost layer. Vinyl halide polymers, especially poly(vinyl chloride) and poly(vinyl fluoride), are also highly desirable. Plural coatings are very often used; these generally include a ground coat, an inked decorative coating, and a clear topcoat.

The coating composition can be in solution in organic solvents or in water, or it can be a latex or a non-aqueous dispersion. In some cases, a preformed film can be applied to the asbestos paper to provide the organic layer. In other instances, the coating composition contains no solvent medium, as is the case, for example, with acrylic sirups and unsaturated polyester resins thinned in monomers such as styrene.

On the other side of the non-woven asbestos sheet, i.e. the major surface opposite the surface containing the organic coating, there is applied a layer of adhesive. Essentially any adhesive can be employed for this purpose, but it is greatly preferred to use a pressure-sensitive adhesive. By "pressure-sensitive adhesive" is meant any adhesive which at the time of application can be applied with hand pressure and which does not require unusual curing or laminating techniques. In the usual case, the pressure-sensitive adhesive employed is a normally tacky, resinous adhesive which has more or less permanent tack. However, contact adhesives, heat-reactivatable adhesives, solvent-reactivatable adhesives, hot melt adhesives and other types of adhesives which may not be normally or permanently tacky can also be employed under suitable conditions of use, i.e. by utilizing them in such a manner as to provide the desired adhesive properties upon contact with the substrate at the time of use.

Broadly speaking, the adhesive can be of any resinous material which provides the desired characteristics. Naturally occurring materials can be used, such as starch, dextrins, animal and vegetable proteins, natural rubber and shellac; modified natural materials are also useful, examples being cellulosics such as cellulose nitrate, polyamides from dimer acids, castor oil-based polyurethanes etc. Among the many synthetic polymer adhesives are those based upon acrylic resins, phenolic resins, various synthetic rubbers and rubber-resin combinations, epoxies, silicones, polyamides, polyesters, vinyl alkyl ethers, polyvinyl esters, polyurethane, polysulfides, amino resins, etc. Mixtures of resins can be used, and the adhesive may be either thermoplastic or thermosetting and may be in solution or in latex form. The choice of adhesive type depends upon considerations such as the characteristics of the asbestos sheet material employed, the manner in which the adhesive is to be applied to the asbestos, the storage conditions, if any, which may be encountered, and the properties desired in the final product.

As indicated, it is greatly preferred to employ normally tacky pressure-sensitive adhesives. These are based on elastomeric resins, generally either natural or synthetic rubber or acrylic resins. Natural or synthetic rubber-based pressure-sensitive adhesives are ordinarily composed of a rubber elastomer combined with a liquid or solid resin tackifier component, along with additives such as plasticizers, fillers and antioxidants. Typical rubbers used include natural rubber and butadiene-styrene (SBR) rubber, and the more usual resinous tackifiers include polyterpene resins, oil-soluble phenolic resins and petroleum hydrocarbon resins. Examples of rubber-based adhesives can be found in U.S. Pats. 2,319,959, 2,410,079, 2,880,186 and 3,058,930.

Because of their greater strength and generally superior properties the preferred pressure-sensitive adhesives are based upon acrylic polymers, i.e. the major resinous component of the adhesive is a polymer in which the constituents are all or in substantial part comprised of one or more acrylic monomers. By "acrylic monomers" is meant acrylic acid and alpha-substituted acrylic acids, such as methacrylic acid or alpha-chloroacrylic acid, and derivatives fosuch acids including esters and amides. Acrylonitrile, methacrylonitrile and similar nitriles are also included.

For the most part, such acrylic adhesives are based upon alkyl acrylates having an average of 4 to 12 carbon atoms in the alkyl groups. The corresponding methacrylic esters are also used in some cases, but provide harder and less tacky polymers and therefore are ordinarily employed in combination with acrylates, if at all. The adhesives often contain minor amounts of other monomers and particularly monomers containing a reactive functional group, such as carboxyl, hydroxyl, amido, cyano, etc. Examples are acrylic acid, acrylamide, and acrylonitrile, and non-acrylic monomers such as maleic acid or anhydride. In many cases the polymers include small or even substantial proportions of non-acrylic monomers, one of the more common being vinyl acetate.

A great many acrylic pressure-sensitive adhesive polymers are known; some examples of these are described in U.S. Pats. 2,438,195, 2,553,816, 2,557,266, 2,884,126, 2,925,174, 3,092,250, 3,189,480, 3,189,581 and 3,268,357.

In addition to the rubber-based or acrylic pressure-sensitive adhesives described above, there can also be used adhesives based upon other elastomeric resinous materials. These include, for example adhesives based upon silicone resins, such as those described in U.S. Pat. 2,965,-592; epoxy-based adhesives such as those described in U.S. 3,100,160; polyvinyl alcohol adhesives, as in U.S. 3,249,572; polyester adhesives, such as those described in U.S. 3,285,872; alkyl vinyl ether adhesives, examples being in U.S. 3,280,217; and adhesives based on other resins and combinations of resins, as in U.S. Pats. 2,570,253, 2,613,156, 2,790,732, 2,882,183, 3,128,202, and 3,232,895.

Conventional coating methods are used to apply the coating and the adhesive to the asbestos sheet material. Roll coating is fast and economical and is therefore a preferred method of applying both the organic coating and the adhesive. However, other application methods, including spraying, brushing, etc. can be employed if desired. In many cases, it is desirable to employ a film adhesive and apply it to the asbestos in a transfer operation. Heat laminating or bonding with an adhesive can be employed with organic coatings in preformed film form. Both the organic coating and the adhesive layer may comprise more than 1 layer of material, this being particularly true in the case of the organic coating where it is often desirable to apply a base and then a top coat of the same or different material with, in many cases, the base coat being printed with a decorative design prior to application of the top coat. Similarly, if desired, a primer can be used under the adhesive layer or several layers of the same or different adhesive can be applied, although this is not ordinarily necessary.

Where the coating (or even the adhesive) requires curing or heat fusion, this can be accomplished in any desired manner. As indicated, even very high temperatures are withstood by the non-woven asbestos and this permits the use of coatings which cannot be successfully applied to other substrates such as wood, plastics and many metals.

The thickness of the organic coating depends only upon the desired appearance and properties, and is chosen with reference to the particular organic coating material and materials employed. Depending upon the manner in which the product is to be used, the number of layers in the coating, and similar factors, the organic coating is usually from about 0.5 to about 15 mils in thickness.

The thickness of the pressure-sensitive adhesive layer is somewhat more important since too thick a coating may not provide the adhesive strength required and may also make it more difficult to apply and to provide a smooth finished product. On the other hand, insufficient adhesive may result in incomplete attachment to the substrate although this in general requires only that a relatively continuous layer be present on the surface of the asbestos sheet to be covered. The amount of adhesive is determined in accordance with conventional practice based upon the particular adhesive being utilized. In most instances, a layer of from about 0.5 to about 10 mils in thickness is applied.

An advantage of the use of non-woven asbestos in producing coated laminates in accordance with the invention is that the asbestos can be subjected to various treatments to improve the decorative and in some cases functional properties of the finished product. For example, the asbestos sheet material can be calendered prior to application of the coating in order to improve its smoothness and to provide a coated product which is more receptive to printing, or the asbestos can be embossed to impart patterns or designs to the surface; this can be carried out either prior to or after the material is coated with the organic coating.

The product obtained in the foregoing manner is a self-adhesive coated laminate which, in addition to its decorative characteristics, has a number of unique properties.

For example, it is shrink resistant in that it is dimensionally stable for long periods after application to a surface, whereas many ordinary materials used for analogous purposes, such as polyvinyl chloride sheet materials, tend to shrink upon aging. The asbestos laminates herein also have excellent heat stability and have insulating qualities as well as being fire retardant because of the non-flammable asbestos. The degree of fire retardancy depends upon the particular organic coating applied and the particular binder, if any, in the asbestos sheet material; for best fire-retardancy, the asbestos sheet should have no binder or a non-flammable binder, such as polyvinyl chloride, and the organic coating chould also be non-flammable, as is the case with poly(vinyl chloride) and poly(vinylidene fluoride).

The invention will be described further in connection with several examples thereof which follow. These examples are illustrative of the invention and are not to be construed as imposing limitations thereon.

Example 1

In this example, the non-woven asbestos sheet material employed is a 15 mil thick asbestos paper composed of crysotile asbestos and containing 15 parts of acrylic elastomer latex binder per 100 parts of asbestos. The acrylic elastomer used as the binder is a copolymer of about 65 percent ethyl acrylate and about 40 percent methyl methacrylate, modified with about 2 percent of an acrylic acid.

The surface of the paper is sized with casein.

The above asbestos paper is coated with an acrylic latex coating composition containing a copolymer of 10 percent ethyl acrylate and 30 percent methyl methacrylate and 20 percent, based on the total resin content, of hexakis(methoxymethyl) melamine. The coating composition is pigmented with titanium dioxide pigment to a pigment to binder ratio of 0.61 to 1 and silica flatting pigment to a total pigment to binder ratio of 0.75 to 1. This coating composition is applied to one side of the asbestos paper to provide a 1.5 to 2 mil (dry film thickness) coating and baked for one minute at 500° F. (paper temperature 400° F.). An acrylic pressure-sensitive adhesive is then applied to the uncoated side of the paper by a transfer operation. The adhesive employed is a film adhesive 1 mil thick, made of an interpolymer of 70 percent 2-ethylhexyl acrylate, 21 percent vinyl acetate, 6 percent acrylic acid and 3 percent 2-cyanoethyl acrylate. The self-adhesive coated asbestos laminate thus obtained is easily handled (the adhesive surface is ordinarily interleaved with release paper) and can be easily applied with hand pressure to various surfaces including wood, metal, plastics, etc. It has a highly decorative and durable surface and provides satisfactory adhesion under varying conditions.

Example 2

In this example, an asbestos paper is employed which is similar to that used in Example 1 except that it is made using poly(vinyl chloride) latex binder. This paper is coated with a coating composition having a resinous vehicle composed of 95 percent poly(vinylidene fluoride) and 5 percent of a copolymer of 70 percent ethyl acrylate and 30 percent methyl methacrylate and pigmented with titanium dioxide to a pigment to binder ratio of 0.41 to 1. This composition is coated on a paper at a 1 mil dry film thickness and baked for 90 seconds at 500° F. After application of adhesive as in Example 1, there is obtained a self-adhesive coated absestos laminate which has an exceptionally durable surface and which is also highly decorative.

Example 3

Example 2 is repeated except that the non-woven asbestos sheet employed is an asbestos paper made without of binder, using a small amount of casein as a size material on the paper. A product of good properties is obtained.

Example 4

In this example, an asbestos paper is employed which is similar to that described in Example 1 except that the binder employed in its manufacture is a neoprene elastomer latex. This paper is coated with a coating composition in which the resinous vehicle is a butylated aldehyde-modified interpolymer of 5 percent acrylamide, 2.5 percent methacrylic acid, 20 percent acrylonitrile and 72.5 percent ethyl acrylate (made in accordance with U.S. 3,037,963). It is pigmented with titanium dioxide at an approximate 1 to 1 pigment to binder ratio. This composition is coated on the asbestos paper to provide about 1.0 mil dry film thickness and baked for 50 seconds at 500° F. The product is coated with pressure-sensitive adhesive as in Example 1 to provide a decorative and durable self-adhesive coated laminate.

Example 5

An asbestos paper similar to that employed in Example 2 except that it is 10 mils thick is coated with an organic coating as described in Example 2. There is then applied to the other side a 1 mil thick layer of pressure-sensitive adhesive made in accordance with U.S. 3,268,357 and having a polymer composed of 60 percent 2-ethylhexyl acrylate and 40 percent vinyl acetate, with a plasticity number of 2.75. The product has good properties as described above.

Example 6

Example 5 is repeated except that the adhesive employed in a combination of polyvinyl ethyl ether, acrylic interpolymer and phenol-aldehyde resin, made as described in Example 1 of U.S. 3,280,217. It is applied as a 2.5 mil film using a transfer operation. The product obtained had good adhesion and surface properties.

Example 7

Example 5 is repeated except that the adhesive employed is a pressure-sensitive adhesive widely used in masking tapes, containing natural rubber combined with esterified rosin. A 1 to 1.5 mil layer is applied from solution. The product has useful properties although the strength of the adhesive bond obtained to most surfaces is lower than that of those above.

Example 8

The non-woven asbestos sheet described in Example 1 is coated with an organic coating on one side as in that example and then coated on the other side with a heat-activated adhesive which is a combination of 20 parts of butadiene-acrylonitrile copolymer rubber (Hycar 1432) and 10 parts of oil-soluble heat-hardenable phenolic resin from the alkaline catalyzed reaction of p-t-butyl phenol and formaldehyde. This adhesive is applied in a 1–2 mil layer from solution in methylethyl ketone and gives a product which is non-tacky at room temperature but which becomes tacky and pressure-sensitive at about 120 to 130° F. It can be easily adhered at these conditions to give a product with good overall properties.

Example 9

An asbestos paper, 10 mils thick and made with about 7.5 percent by weight of poly(vinyl chloride) binder is coated with a 1.5 mil dry coating of poly(vinyl chloride) plasticized with di(isodecyl) phthalate and pigmented wth titanium dioxide and silica. The coating composition is applied as a dispersion and baked for 60 seconds at 450° F. To the other side of the asbestos there is applied a pressure-sensitive adhesive as described in Example 1. The product has excellent properties.

According to the provisions of the patent statutes, there are described above the invention and what are now considered to be its best embodiments. However, within the scope of the appended claims, it is to be understood that the invention can be practiced otherwise than as specifically described.

We claim:
1. A laminated sheet article having an organic resin coating on one surface and an adhesive layer on the opposite surface, consisting essentially of:
a non-woven sheet of asbestos fibers,
a surface layer of organic resin on one surface of said sheet, and
a layer of adhesive material on the opposite surface of said sheet.
2. The laminate of claim 1 in which said adhesive is a normally tacky pressure-sensitive adhesive.
3. The laminate of claim 1 in which said organic coating composition contains as the major resinous component thereof a heat-curable or heat-fusible resin.
4. The laminate of claim 1 in which said non-woven asbestos sheet material contains a plurality of layers of different organic coating compositions.
5. The laminate of claim 1 in which said non-woven asbestos sheet material is fibrous asbestos bound together with an acrylic resin binder.
6. The laminate of claim 1 in which the adhesive is a normally tacky polymer of one or more acrylic monomers.
7. A coated self-adhesive laminate consisting essentially of asbestos paper coated on one major surface with at least one layer of resinous organic coating composition in which the film-forming resin is a polymer of monomers consisting essentially of polymerizable compounds having the $CH_2=C<$ group, and coated on the other major surface with a normally tacky pressure-sensitive adhesive.
8. The laminate of claim 7 in which said organic coating composition comprises a vinyl halide resin.
9. The laminate of claim 7 in which said organic coating composition comprises poly(vinylidene fluoride).
10. The laminate of claim 7 in which the asbestos paper is made using a vinyl chloride polymer binder.
11. The laminate of claim 7 in which said organic coating composition comprises an aldehyde-modified interpolymer of an unsaturated carboxylic acid amide and at least one other ethylenic monomer.
12. The laminate of claim 7 in which the major component of said pressure-sensitive adhesive is a normally tacky interpolymer of monomers comprising one or more alkyl acrylates having an average of 4 to 12 carbon atoms in the alkyl group and a copolymerizable monomer containing a reactive functional group.
13. The laminate of claim 12 in which said pressure-sensitive adhesive is partially cross-linked by reacting a polyfunctional material with the functional group of the interpolymer.
14. A coated self-adhesive laminate consisting essentially of non-woven asbestos sheet materials having on one major surface thereof a layer of adhesive and on the other major surface an organic coating comprising a ground coat, an inked decorative coat and a clear topcoat.
15. The laminate of claim 14 in which said adhesive is a normally tacky pressure-sensitive adhesive.
16. The laminate of claim 14 in which said clear topcoat is a layer of a coating composition in which the major resinous component is poly(vinylidene fluoride).
17. The laminate of claim 14 in which said clear topcoat is a layer of a coating composition in which the major resinous component is a vinyl chloride polymer.

References Cited

UNITED STATES PATENTS

| | | | |
|---|---|---|---|
| 1,960,180 | 5/1934 | Cunningham | 161—205 |
| 2,822,290 | 2/1958 | Webber | 161—167 X |
| 3,018,206 | 1/1962 | Hood et al. | 161—205 |
| 3,236,677 | 2/1966 | Bradstreet | 161—167 X |
| 3,238,078 | 3/1966 | Baldwin | 161—205 X |
| 3,307,544 | 3/1967 | Gander et al. | 161—167 X |
| 3,356,554 | 12/1967 | Crouch et al. | 161—205 X |
| 2,752,275 | 6/1956 | Raskin et al. | 161—104 |
| 2,880,090 | 3/1959 | Feigley | 117—126 X |
| 3,415,674 | 12/1968 | Voisinet | 117—126 X |
| 3,427,216 | 2/1969 | Quinn | 161—205 |
| 3,442,730 | 5/1969 | Dietz | 161—205 X |
| 3,464,543 | 9/1969 | Kwiatanowski et al. | 117—126 X |

HAROLD ANSHER, Primary Examiner

U.S. Cl. X.R.

117—47, 122, 126; 161—182, 189, 205